INVENTORS:
GABOR ADAM VESZI and
PETER MARKUS

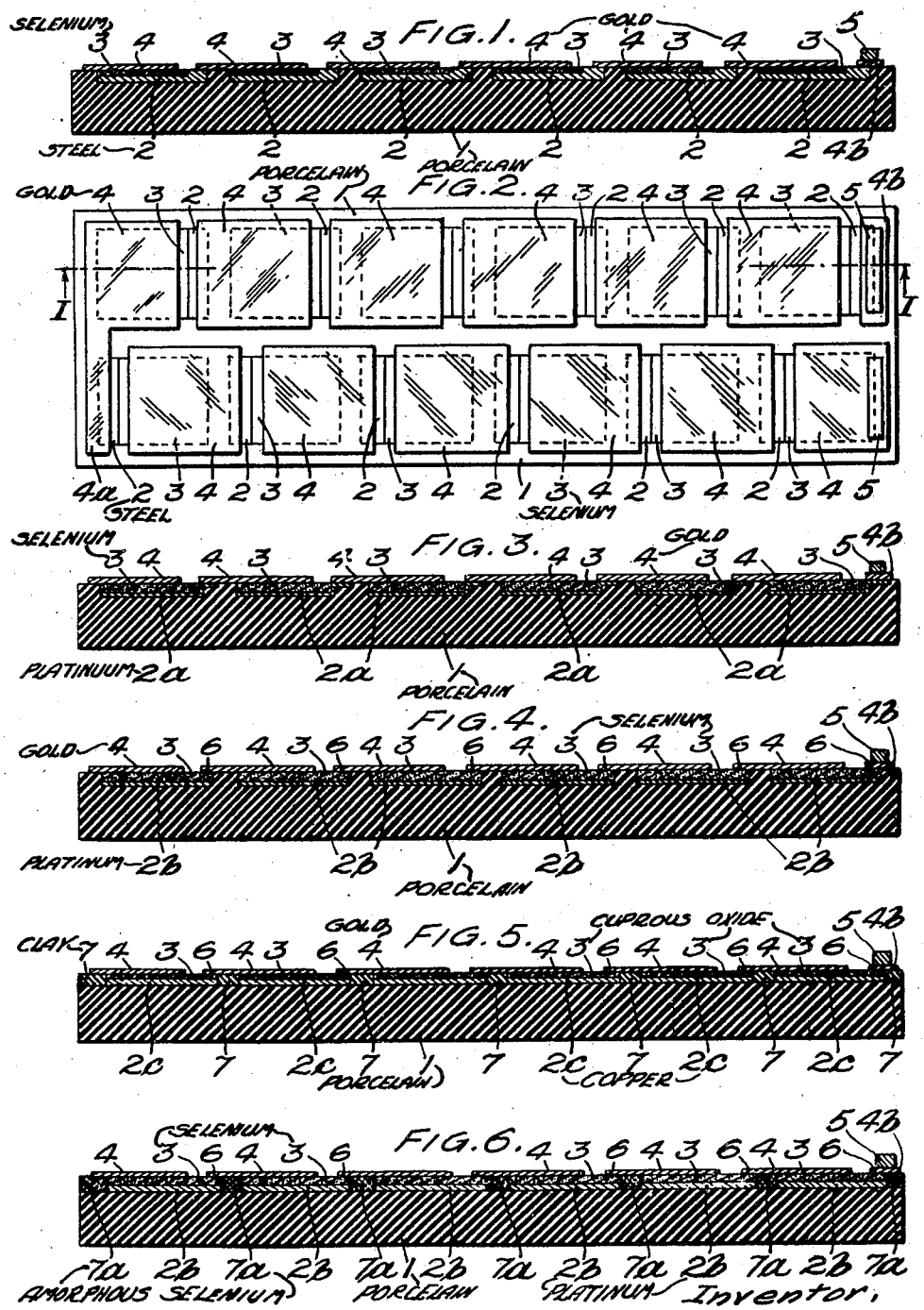

Patented Oct. 7, 1947

2,428,537

UNITED STATES PATENT OFFICE 2,428,537

SERIES PHOTOELECTRIC CELLS

Gabor Adam Veszi and Peter Markus,
Bishop's Stortford, England

Application July 16, 1943, Serial No. 494,956
In Great Britain July 20, 1942

8 Claims. (Cl. 136—89)

1

This invention relates to photoelectric cells and refers more particularly to semi-conductor photoelectric cells of the blocking or barrier layer type.

Hitherto the use of these cells has been somewhat restricted by the difficulties encountered in amplifying their output by means of valve amplifiers. These difficulties arise partly from the low internal resistance of such cells and partly from their small voltage output.

The internal resistance can be increased to a certain extent by using cells of smaller size. To increase the voltage output it has been proposed to connect a plurality of such smaller cells in series, but this has never been commercially carried out in practice because of the difficulty of assembling the small cells into a mechanically, electrically and optically satisfactory unit, and connecting them in series.

The present invention has for its object the provision of an improved unit comprising a number of such small cells connected in series, which unit will be easy to make and will be mechanically, electrically and optically satisfactory.

In order that the invention may be the more clearly understood, a number of multiple cell units in accordance therewith will now be described, reference being made to the accompanying drawings, wherein:

Figure 1 is a sectional side elevation of one of said units, the section being taken on line I—I of Figure 2;

Figure 2 is a plan of the said unit;

Figs. 3 to 6 are sectional side elevations of modifications of the unit shown in Fig. 1.

Figure 7:
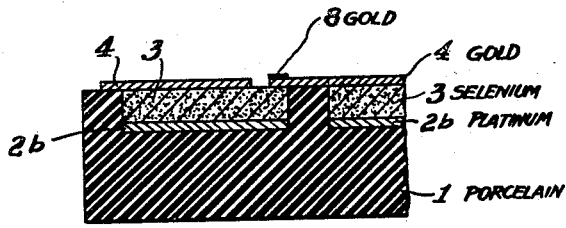
Figs. 7 to 11 show further modifications of the units shown in Figs. 1 and 2.

Referring first to Figures 1 and 2, these figures illustrate a unit in which each top layer overlaps an extending portion of a bottom or collecting layer of the next cell. Thus the reference I designates the common insulating support plate, 2 the bottom or collecting layers, 3 the semi-conductor layers of, say, selenium and 4 the top transparent layers of, say, gold. It will be seen that the insulating support plate I is provided with shallow recesses, and the layers 2 take the form of metal plates of, say, steel, each of which is thickened near one edge as shown so as to provide a narrow strip which is flush with the surface of the plate I. The semi-conductor layers 3 are then filled in above the major relatively thin portions of the plates 2 so as to be also flush with the surface of the plate I. Finally the top transparent layers 4 are applied and each one, which carefully avoids making contact with the underneath layer 2 of its

2 own cell, is extended to overlap the thickened strip of the adjacent layer 2 as shown. It will be appreciated that, as heretofore described, the plates 2 are first anchored in the recesses, the semi-conductor layers 3 are then applied simultaneously and subjected to heat and/or pressure treatment, and finally the top transparent layers 4 are applied simultaneously by evaporation or sputtering of the metal through the openings of a grid-shaped mask.

The semi-conductor layers 3, say, selenium, may be applied to the whole unit simultaneously and heat and/or pressure treatment applied to it in the well known manner. If the insulating material constituting the supporting plate is well chosen and properly treated, none of the selenium should be found adhering to the top surface of the supporting plate between the recesses. Should this not be the case the superfluous selenium may easily be removed by grinding or scratching.

It will be seen that, in the particular arrangement described, there are two parallel rows each of six cells and that the order of the series connection of the twelve cells extends along one row and back along the other. It will be seen that, in order for the top layer 4 of the cell at the end of the one row to overlap the collecting layer 2 of the adjacent cell at the end of the other row, said top layer 4 is formed with a laterally extending tongue 4a and that the cells of the two rows are arranged the reverse way round. The external connections from the two end cells of the series are taken by means of contact strips 5 from the layer 4 of one of said end cells and from a narrow layer 4b overlapping the thickened portion of the plate 2 of the other of said end cells.

Referring now to Figure 3, the unit illustrated in this figure is the same as that illustrated in Figures 1 and 2 except that the bottom collecting layers, instead of being constituted by metal plates 2 are constituted by thin layers 2a of platinum applied to the plate I by sputtering or burning. As shown these thin layers 2a are applied so as to cover the bottom of the recesses and also one of the walls and part of the adjacent surface of the plate I towards the next cell. The semi-conductor layers 3 are then fitted into the recesses flush with the surface of the plate I, and when the top layers are subsequently applied they are each extended so as to overlap the portion of the adjacent underneath layer which is extended on to the surface of the plate I.

Referring to Figure 4, this illustrates a unit in which each top layer overlaps and makes electrical contact with the semi-conductor layer of the adjacent cell. Thus recesses are made in the plate 1 substantially as before, and in the bottom of these recesses are applied good-conducting layers 2b of metal e. g. platinum, either in the form of plates or by sputtering or burning. The recesses are then simultaneously filled up as before flush with the semi-conductor layers 3 and finally the top transparent layers 4 are simultaneously applied, each one, as shown, overlapping the layer 3 of the adjacent cell on one side and leaving room for the layer 3 of its own cell to be overlapped by the layer 4 of the adjacent cell on the other side. Obviously, if provision were not made to the contrary, the overlapping by each top layer of the semi-conductor layer of the adjacent cell would set up an undesired blocking or barrier layer in opposition to the main blocking or barrier layer between said top layer and its own proper semi-conductor layer, and, although the area of this undesired barrier layer would be much smaller than that of the main barrier layer it would detract undesirably from the total output. To avoid this, any or all of the following expedients may be adopted:

(a) The part of the top layer which overlaps the semi-conductor layer of the adjacent cell can be made non-transparent or, at least, less transparent than the part which covers its own proper semi-conductor layer. This can be done by making the said overlapping part thicker or by covering it with a non-transparent material 8, e. g. gold (Fig. 7).

Figure 8:
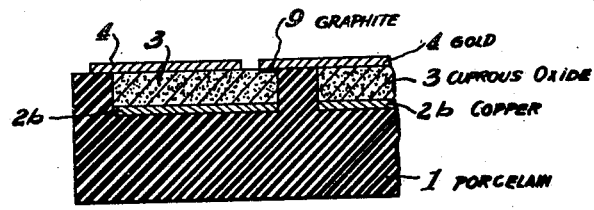

(b) Between the said overlapping part of the top layer and the adjacent semi-conductor layer which it overlaps a conducting material 9 may be provided which makes the undesirable blocking layer less stable or less effective, or which eliminates said undesirable blocking layer altogether. An example of such a material, when the semi-conductor is cuprous oxide, is graphite (Fig. 8).

Figure 9:
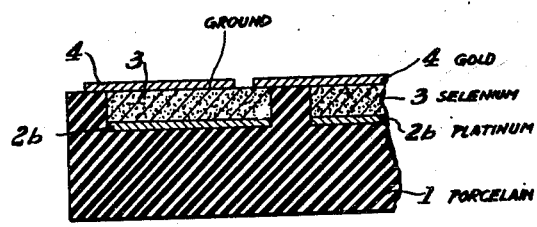

(c) The part of the semi-conductor layer which is overlapped by the adjacent top layer may be so treated that substantially no undesired blocking layer is developed. In the case when the semi-conductor is selenium this can be done by grinding (Fig. 9).

Figure 10:
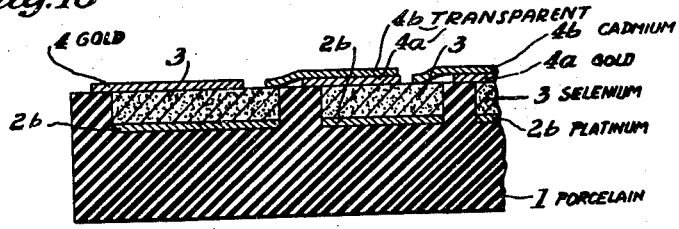

(d) The top layer may be constituted by two superimposed layers 4a and 4b of different metals e. g. gold and cadmium, respectively, calculated to give the most active or stable blocking layer effect, only the upper of said layers being extended, however, to overlap the semi-conductor layer 3 of the adjacent cell, so that the undesired blocking layer is less stable or active than the main blocking layer (Fig. 10).

Figure 11:
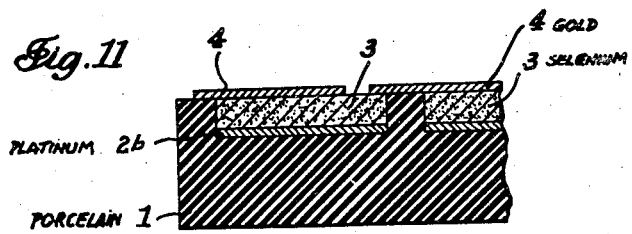

(e) Finally, the undesired blocking layer can be deteriorated by forced aging accomplished for instance by exposure of the cell to intense illumination (Fig. 11).

It will be appreciated that the good conducting layer underneath each semi-conductor layer increases the conductivity between said top layer and the more distant parts of said adjacent semi-conductor layer.

Referring now to Figure 5, the units illustrated in this figure are the same as that illustrated in Figure 4 except that the plate 1 is not formed with recesses. Instead the underneath conducting layers 2c which might consist of copper are applied on the surface of said plate 2 and are then coated with the semi-conducting layers 3 after which the spaces between the semi-conductor layers together with their underneath layers are filled in with a non-conducting medium 7, such as clay, wax or lacquer. Finally the top layers 4 are applied as in Figure 4. This method of procedure lends itself especially to units in which the semi-conductor layers are cuprous oxide. The layers 2c would then take the form of islets of copper electrolytically deposited and the cuprous oxide layers would be formed by oxidizing the surface of the layers 2c in the usual way. Said method of procedure illustrated in Figure 5 can, however, be equally well employed when the semi-conductor layers are selenium. In that case the underneath conducting layers are applied in any suitable way and the selenium is then applied as a single layer over the whole surface and is afterwards separated into the individual layers by cutting, after which the filling 7 is applied. If desired the underneath conducting layers could also be applied as a single layer and separated into the individual layers by cutting simultaneously with the separation of the selenium.

Referring to Figure 6, this is the same as Figure 5, except that the semi-conducting layers 3 are specifically selenium and the insulating filling 7a takes the form of selenium reconverted to its amorphous insulating form. Thus, the individual insulated selenium layers are produced by first applying a single selenium layer over the whole supporting plate and treating it in the usual way, and then reconverting a grid or network of the selenium to its amorphous insulating form in such a way as to leave the layers of semi-conducting selenium, insulated by the grid or network of amorphous insulating selenium. This reconversion can be effected by pressing a steel grid or network heated to from 300 to 400 degrees centigrade for a short time to the selenium surface.

The conducting bottom layers 2b will of course be applied first and in such positions that the gaps between them will coincide with the grid of reconverted insulated selenium. The plates 2b may be similar to those of Figure 4.

It should be stressed that the selenium layers 3 are very thin and such bad conductors that actually no danger of short circuits between consecutive top layers 4 exists. In this connection, it should also be noted that in the drawing the thickness of the selenium layers 3 has been exaggerated so as to make it possible to properly show them. Actually these layers 3 are so thin that their resistance from their upper to their lower surface can be ignored, whereas their resistance longways from one top layer 4 to the next is so high that the conductivity of the selenium layers 3 between each two top layers 4 is negligible.

In all the modifications the top layers are preferably applied simultaneously. They can easily be applied over the correct regions by the use of a suitable grid-shaped mask. In all the modifications the support plate can be made either of an electrically insulating material of suitable mechanical and chemical properties, such as porcelain or glass, or it can consist of a metal core covered with a layer of insulating material. It could, for example, be of anodized aluminum or enameled steel. To ensure good mechanical contact and sufficient adhesion between said support plate and the semi-conductor layers or bottom conductor layers, and also good electrical contact between the bottom conductor layers and semi-conductor layers in the case when the former are sputtered, the appropriate parts or the whole of the support plate may be roughened by etching, sand-blasting or other means.

In referring to blocking layers we are merely conforming to current theory about cells of this type. The invention is obviously independent of whether or not this theory is correct.

Where there are several parallel rows of component cells, connections can be made between adjacent end cells of neighboring rows in the same way as between cells in the same row. It will be appreciated that in this case, the extending portion of the top layer of the end cell of one row will take the form of a laterally extending tongue overlapping either, as in Figure 2, the extending portion of the bottom layer of the end cell of the adjacent row or the appropriate portion of the semi-conductor layer of said end cell of the adjacent row.

This involves the position of the active area of each component cell, in relation to the connection thereof to the next cell of the row, being reversed from one row to the next. Contact strips need only be applied to the first and last unit.

This reversing from row to row of the position of the active areas of the cells in relation to their connections is sometimes inconvenient. For example, it renders the making of the mask, used as hereinafter described, in applying the top layers, more complex. In some cases it may be preferred therefore to make these relative positions the same for all of the rows and to effect the series connection of the several rows by means of external conductors in any desired way. With this arrangement contact strips are required at each end of each row and opposite end contact strips of adjacent rows are connected by external conductors.

The invention is, of course, not in any sense limited in respect of dimensions. It may be said, however, that, in practice, the unit of Figures 1 and 2 has been manufactured with the recesses 6 millimeters square by one millimeter deep and separated from one another by walls 0.5 millimeter thick, the semi-conductor layers being 0.1 millimeter thick.

The unit of Figure 5 has been manufactured with the underneath layers 2c and 3 of electrolytically deposited copper covered by cuprous oxide 10 millimeters square and each separated from its neighbors by gaps of 1 millimeter.

What we claim and desire to secure by Letters Patent is:

1. A unit battery of semi-conductor photoelectric cells, comprising a common insulating base, good conducting collecting layers located at intervals on said base, semi-conductor layers covering the respective collecting layers except for portions of the latter which remain uncovered, and transparent metal layers located on the respective semi-conductor layers to complete the cells, each of said transparent metal layers extending from its semi-conductor layer so as to overlap, and make electrical contact with, the uncovered portion of the collecting layer of the adjacent cell.

2. A unit battery of semi-conductor photoelectric cells, comprising a common insulating base formed with shallow recesses in its surface, metal plates filled into said recesses, each metal plate having a thick portion whose surface is flush with the surface of the base and a less thick portion whose surface is sunk below the surface of the base, a semi-conductor layer applied on the surface of the less thick portion of each plate to a level flush with the surface of the base, and a transparent metal layer applied on the surface of each semi-conductor layer to complete a cell and extended from said semi-conductor layer so as to overlap the thick portion of the collecting layer of the adjacent cell.

3. A unit battery of semi-conductor photoelectric cells, comprising a common insulating base formed with shallow recesses in its surface, a thin good conducting collecting layer applied to the bottom of each recess and also one of the walls thereof and part of the adjacent surface of said insulating base outside said recess, a semi-conducting layer filling up each recess on top of said collecting layer to the level of the surface of the base, and a transparent metal layer applied on the surface of each semi-conductor layer to complete a cell and extended from said semi-conductor layer so as to overlap the part of the collecting layer of the adjacent cell which is outside its recess.

4. A unit battery of semi-conductor photoelectric cells, comprising a common insulating base, good conducting layers mounted at intervals on said base, semi-conductor layers mounted on said good conducting layers, and transparent metal layers covering the respective semi-conductor layers, except for portions of the latter which remain uncovered, and each extending from its semi-conductor layer so as to overlap, and make electrical contact with, a part of the uncovered portion of the semi-conductor layer of an adjacent cell.

5. A unit battery of semi-conductor photoelectric cells, comprising a common insulating base, good conducting layers mounted at intervals on said base, semi-conductor layers mounted on said good conducting layers, and transparent metal layers covering the respective semi-conductor layers, except for portions of the latter which remain uncovered, and each extending from its semi-conductor layer so as to overlap, and make electrical contact with, a part of the uncovered portion of the semi-conductor layer of an adjacent cell, each transparent layer being constituted by two super-imposed layers of different metals calculated to give a good blocking layer effect, and only the upper of said layers being extended to overlap the semi-conductor layer of the adjacent cell whereby the setting up of an undesired blocking or barrier layer, by the overlapping, by each transparent metal layer, of the semi-conductor layer of the adjacent cell is minimized.

6. A unit battery of semi-conductor photoelectric cells, comprising a common insulating base, good conducting layers mounted at intervals on said base, layers of semi-conductor selenium mounted on said good conducting layers, selenium reconverted to its amorphous insulating form filling in the spaces between said semi-conductor selenium layers and giving a flat surface, and transparent metal layers covering the respective semi-conductor layers, except for portions of the latter which remain uncovered, and each extending from its semi-conductor layer so as to overlap, and make electrical contact with, a part of the uncovered portion of the semi-conductor layer of an adjacent cell.

7. A unit construction of a plurality of semi-conductor photoelectric cells, comprising a common insulating base, good conducting layers mounted at intervals on said base, layers of semi-conductor selenium mounted on said good conducting layers, selenium reconverted to its amorphous form filling in the spaces between said semi-conductor selenium layers, and transparent metal layers covering the respective semi-conductor selenium layers.

8. A unit construction of a plurality of semi-conductor photo-electric cells, comprising a common insulating base, good conducting layers mounted at intervals on said base, layers of semi-conductor selenium mounted on the respective good conducting layers, selenium reconverted to its amorphous form filling in the spaces between said good conducting layers and between said semi-conductor selenium layers, and transparent metal layers covering the respective semi-conductor selenium layers.

GABOR ADAM VESZI.
PETER MARKUS.

REFERENCES CITED

The following references are of record in the file of this patent:

UNITED STATES PATENTS

| Number | Name | Date |
|---|---|---|
| 2,140,994 | Gorlich | Dec. 20, 1938 |
| 1,900,018 | Lilienfeld | Mar. 7, 1933 |
| 2,000,642 | Lamb | May 7, 1935 |
| 2,137,831 | Brunke | Nov. 22, 1938 |
| 2,305,576 | Lamb | Dec. 15, 1942 |
| 1,848,655 | Petrik | Mar. 8, 1932 |

FOREIGN PATENTS

| Number | Country | Date |
|---|---|---|
| 641,081 | Germany | Jan. 20, 1937 |
| 655,927 | Germany | Jan. 26, 1938 |
| 649,335 | Germany | Aug. 20, 1937 |